US012684658B1

(12) United States Patent
Ye et al.

(10) Patent No.: US 12,684,658 B1
(45) Date of Patent: Jul. 14, 2026

(54) FOOD WARMING PAD

(71) Applicant: Guangdong Willing Technology Corporation, Huizhou (CN)

(72) Inventors: Jingnong Ye, Huizhou (CN); Shifa Luo, Huizhou (CN)

(73) Assignee: Guangdong Willing Technology Corporation, Huizhou (CN)

(*) Notice: Subject to any disclaimer, the term of this patent is extended or adjusted under 35 U.S.C. 154(b) by 0 days.

(21) Appl. No.: 19/078,325

(22) Filed: Mar. 13, 2025

(30) Foreign Application Priority Data

Jan. 13, 2025 (CN) ........................ 202520074716.X

(51) Int. Cl.
*H05B 3/34* (2006.01)
*H05B 3/74* (2006.01)

(52) U.S. Cl.
CPC ................. *H05B 3/34* (2013.01); *H05B 3/74* (2013.01); *H05B 2203/003* (2013.01); *H05B 2203/028* (2013.01)

(58) Field of Classification Search
CPC .................................... H05B 3/34; H05B 3/74
USPC .......................................................... 219/528
See application file for complete search history.

(56) References Cited

U.S. PATENT DOCUMENTS 3,889,101 A * 6/1975 Woods .................... A61F 7/007 604/291
4,197,449 A * 4/1980 Fessenden ............... H05B 3/34 219/535
4,896,019 A * 1/1990 Hyun ..................... B23K 3/025 30/140
6,084,206 A * 7/2000 Williamson ........... H05B 3/148 219/548
6,476,361 B2 * 11/2002 Kasai ....................... H05B 3/28 219/544
6,521,873 B1 * 2/2003 Cheng .................... H05B 3/342 219/528
6,653,607 B2 * 11/2003 Ellis ........................ A61F 7/007 219/217
6,831,256 B2 * 12/2004 Haasis ................ A47J 37/0676 219/465.1
7,019,265 B2 * 3/2006 Coleman .............. H05B 6/6494 219/400
8,106,336 B2 * 1/2012 Lawrence ................ H05B 3/68 219/458.1
2004/0069767 A1 * 4/2004 Haasis ................ A47J 37/0676 219/465.1
2004/0112891 A1 * 6/2004 Ellis ........................ A61F 7/007 219/217

(Continued)

*Primary Examiner* — Elizabeth M Kerr
*Assistant Examiner* — Simpson A Chen
(74) *Attorney, Agent, or Firm* — S.J. INTELLECTUAL PROPERTY LTD.

(57) ABSTRACT

A food warming pad includes a heating pad and a heating wire. The heating pad is a flexible pad. A bottom surface of the heating pad is provided with a winding wiring groove. A bottom of the wiring groove is provided with a winding notch. A winding flexible sleeve is sleeved on the heating wire. The heating wire passes through the winding notch and is installed in the wiring groove. The heating wire is distributed along an extension direction of the wiring groove. A bottom of the flexible sleeve protruded outside of the winding notch. The flexible sleeve and the wiring groove are hot-melt-molded into one piece.

13 Claims, 7 Drawing Sheets

(56) References Cited

U.S. PATENT DOCUMENTS

| | | | | |
|---|---|---|---|---|
| 2006/0241730 | A1* | 10/2006 | Huang | A61F 7/007<br>607/98 |
| 2007/0221644 | A1* | 9/2007 | Gifford | B62J 33/00<br>74/551.9 |
| 2008/0110876 | A1* | 5/2008 | Yang | H05B 3/34<br>219/528 |
| 2008/0245784 | A1* | 10/2008 | Lawrence | H05B 3/68<br>29/592.1 |
| 2010/0116818 | A1* | 5/2010 | Gabbay | H05B 6/36<br>219/528 |
| 2021/0108830 | A1* | 4/2021 | Etzkorn | H05B 3/262 |
| 2025/0063637 | A1* | 2/2025 | Ye | H05B 3/34 |

* cited by examiner

FOOD WARMING PAD

CROSS REFERENCE TO RELATED APPLICATIONS

This application claims priority benefits to Chinese Patent Application No. 202520074716X, filed on Jan. 13, 2025, the contents of which are incorporated herein by reference.

TECHNICAL FIELD

The present disclosure relates to food warming devices, and in particular, to a food warming pad.

BACKGROUND

A food warming pad can be placed on a tabletop to heat dishes or maintain their temperature, eliminating the need for reheating.

SUMMARY

A first aspect of the present disclosure provides a food warming pad, including a heating pad and a heating wire. The heating pad is a flexible pad, a bottom surface of the heating pad is provided with a winding wiring groove, a bottom of the wiring groove is defined with a winding notch; the heating wire is sleeved by a winding flexible sleeve, the winding flexible sleeve is installed in the wiring groove by passing through the winding notch, the heating wire is distributed along an extension direction of the wiring groove, a bottom of the flexible sleeve is protruded outside the winding notch, and the flexible sleeve and the wiring groove are hot-melt-molded into one piece.

BRIEF DESCRIPTION OF THE DRAWINGS

The drawings constituting a part of the present disclosure are intended to provide a further understanding of the present disclosure. The embodiments of the present disclosure and their descriptions are intended for explaining and do not constitute improper limitations on the present disclosure.

DETAILED WAY

The following description will be combined with the drawings to clearly and completely describe the technical solutions in the embodiments of the present disclosure, but it does not constitute a limitation on the protection scope of the present disclosure.

In the present disclosure, for a clearer description, some explanations are made as follows. It should be pointed out that terms “front end”, “rear end”, “left side”, “right side”, “middle”, “above”, “below” and other indications of orientations or position relationships in the text are not intended to have absolute orientations but are instead intended to describe relative positions of various components with respect to each other. In addition, the terms “first”, “second”, “third”, and “fourth” are simply intended to distinguish one item from another, and is not intended to require a sequential order or quantity unless otherwise specified.

In the related art, one type of food warming pad involves inserting heating wires into a wiring groove at the bottom of a silicone pad and then sealing the heating wires with adhesive. The problem with this food warming pad is that it is difficult to apply the adhesive evenly. Another type of food warming pad uses two layers of silicone pads to sandwich the heating wires, which are formed as a single unit. The issue with this food warming pad is that it requires two rounds of pressing the silicone pads, resulting in high material and labor costs.

Figure 1:
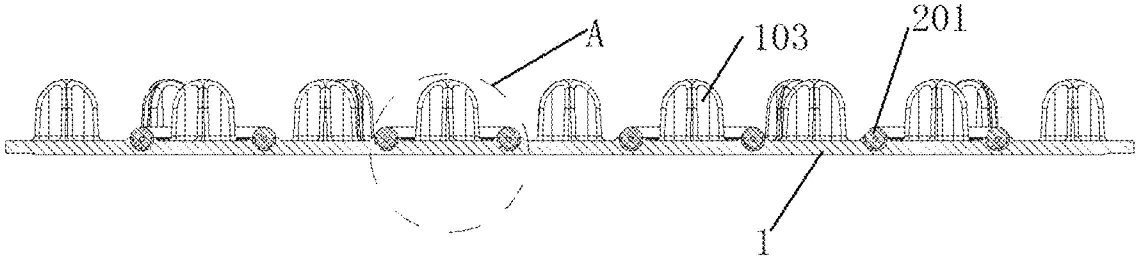
FIG. 1 is a cross-sectional view of Embodiment 1 of the present disclosure.
Figure 2:
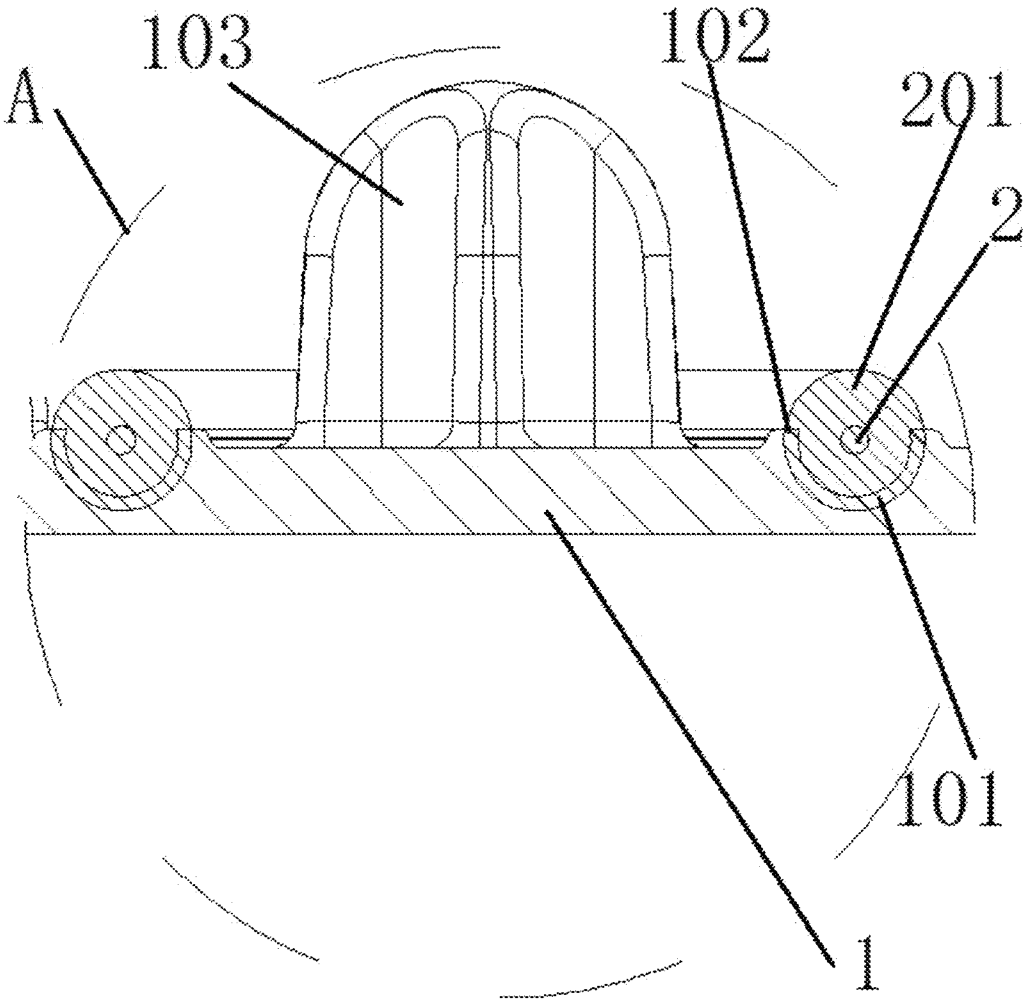
FIG. 2 is an enlarged view of area of A in FIG. 1.
Figure 3:
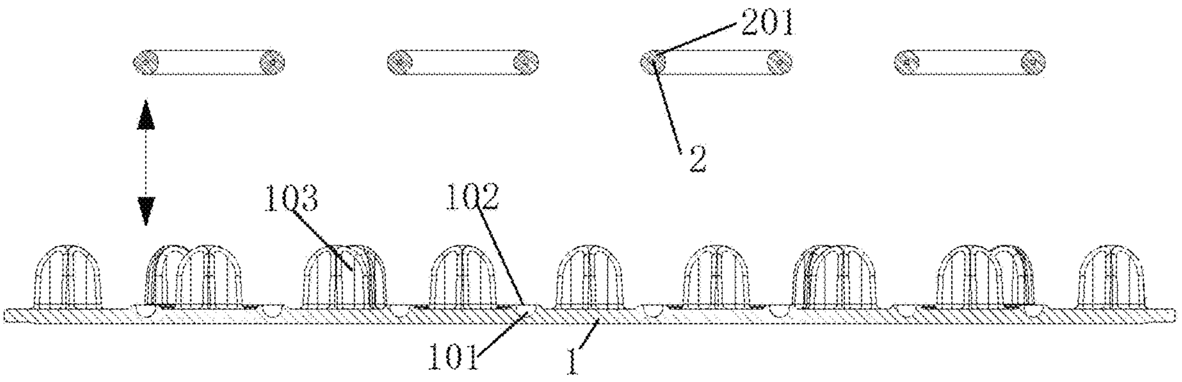
FIG. 3 is an exploded, cross-sectional view in accordance with the embodiments of the present disclosure.
Figure 4:
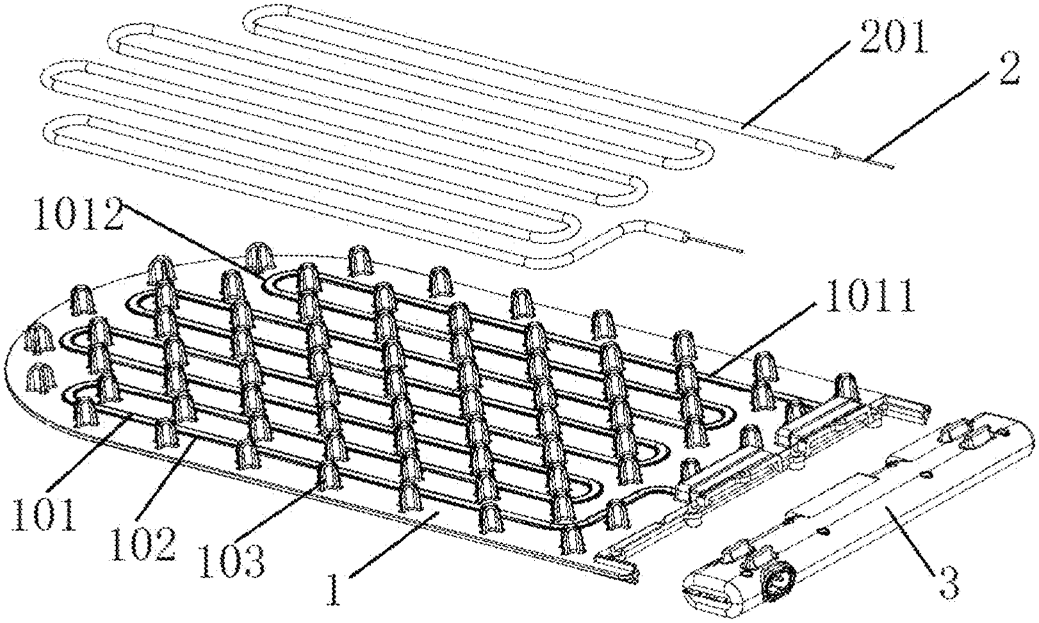
FIG. 4 is an exploded view in accordance with the embodiments of the present disclosure.
Figure 5:
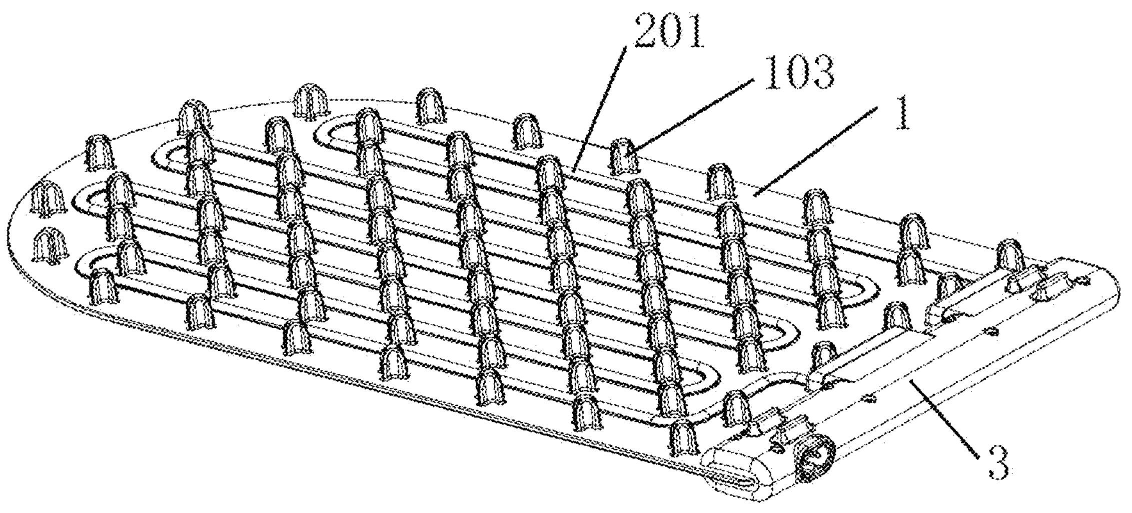
FIG. 5 is a perspective view in accordance with the embodiments of the present disclosure.

Referring to FIGS. 1 to 5, the embodiments provide a food warming pad, including a heating pad 1 and a heating wire 2. When an observer faces the attached FIG. 1, the observer’s bottom is considered the top, and the observer’s top is considered the bottom. The heating pad 1 is a flexible pad. A bottom surface of the heating pad 1 is provided with a winding wiring groove 101, and a bottom of the wiring groove 101 is defined with a winding notch 102. A winding flexible sleeve 201 is sleeved outside the heating wire 2, and the heating wire 2 is threaded through the winding notch 102 and is installed in the wiring groove 101. The heating wire 2 is distributed continuously along an extension direction of the wiring groove 101. A bottom of the flexible sleeve 201 is protruded downward to the outside of the winding notch 102. The flexible sleeve 201 and the wiring groove 101 are hot-melt-molded into one piece. The principle is as follows. The heating pad is a flexible pad, the bottom surface of the heating pad is provided with a winding wiring groove, and the bottom of the wiring groove is provided with a winding notch. A winding flexible sleeve is sleeved outside the heating wire, and the heating wire is threaded through the winding notch and is installed in the wiring groove. The heating wire is distributed continuously along the extension direction of the wiring groove, the bottom of the flexible sleeve protrudes downward to the outside of the winding notch, and the flexible sleeve and the wiring groove are hot-melted and integrated. The heating pad and the heating wire is integrated into one piece by the following steps: the flexible sleeve 201 is clamped in the wiring channel of a mold; the flexible sleeve 201 is pressed into the wiring groove of the heating pad by using the mold; the flexible sleeve which sleeves the heating wire and the wiring groove of the heating pad are integrated through hot melting by the mold; the wiring channel of the mold is removed from the flexible sleeve carrying the heating wire (that is, the wiring channel is removed from the portion of the flexible sleeve which protrudes outside the winding notch). From the above description, it can be seen that the flexible sleeve which sleeves the heating wire is integrated with the wiring groove of the heating pad by hot melting, without the need for adhesive or two layers of silicone pads, thereby reducing material and labor costs.

Manufacturing process is described as follows.

Step S1, selecting a heating pad 1, a heating wire 2, and a mold. The heating pad 1 is a flexible pad, a bottom surface of heating pad 1 is provided with a winding wiring groove 101. A bottom of wiring groove 101 is defined with a winding notch 102. The heating wire 2 is sleeved by a winding flexible sleeve 201. The mold is provided with a wiring channel.

Step S2, wiring: first clamping the heating wire 2 in the wiring channel of the mold, and then pressing the heating wire 2 into the wiring groove 101 of the heating pad by using the mold.

Step S3, hot melting: the mold integrates the flexible sleeve 201 which sleeves the heating wire 2 and the wiring groove 101 of the heating pad 1 by hot melting.

Step S4, demolding: removing the wiring channel of the mold from the flexible sleeve 201 which sleeves the heating wire 2, and pressing the flexible sleeve 201 to be protruded to the outside of the winding notch.

The heating pad 1 is a silicone pad and the flexible sleeve 201 is a silicone sleeve, as silicone is soft and resistant to high temperature.

An edge of the winding notch 102 protrudes downward with respect to the bottom surface of the heating pad 1. As it is necessary to maintain a specific distance (e.g. 2 mm) between the heating wire and the top surface of the heating pad, the edge of the winding notch 102 extends downward to reduce the thickness required for the heating pad.

The bottom surface of the heating pad 1 is also provided with a plurality of foot pads 103. A distance that a bottom surface of each foot pad 103 extends downward with respect to the bottom surface of the heating pad 1 is greater than a distance of the edge of the winding notch 102 extends downward with respect to the bottom surface of the heating pad 1. The foot pads 103 can facilitate air circulation and heat dissipation under the heating pad.

An edge of the heating pad 1 is provided with a power supply 3, and the two ends of the heating wire 2 are electrically connected to the power supply 3. The power supply 3 can provide electrical energy for the heating wire.

A cross-section of the wiring groove 101 is arc-shaped or square, and a cross-section of the flexible sleeve 201 is circular. The arc-shaped or square wiring groove is convenient for hot-melt integration with the winding flexible sleeve with the circular cross-section.

A thickness of the flexible sleeve 201 is not smaller than 2 mm, and an outer diameter of the flexible sleeve 201 is not smaller than 5 mm. The thickness in this range can ensure the safety of the use of the heating wire.

The wiring groove 101 includes a plurality of mutually parallel straight segments 1011 and a plurality of winding segments 1012, and the plurality of straight segments 1011 are connected to the plurality of winding segments 1012 alternately. The wiring groove arranged in this way allows the heating wire to be evenly distributed on the bottom surface of the heating pad 1.

Figure 6:
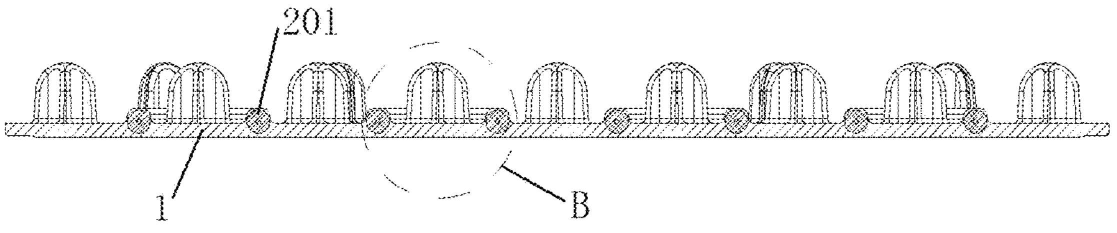
FIG. 6 is a cross-sectional view in accordance with the embodiments of the present disclosure.
Figure 7:
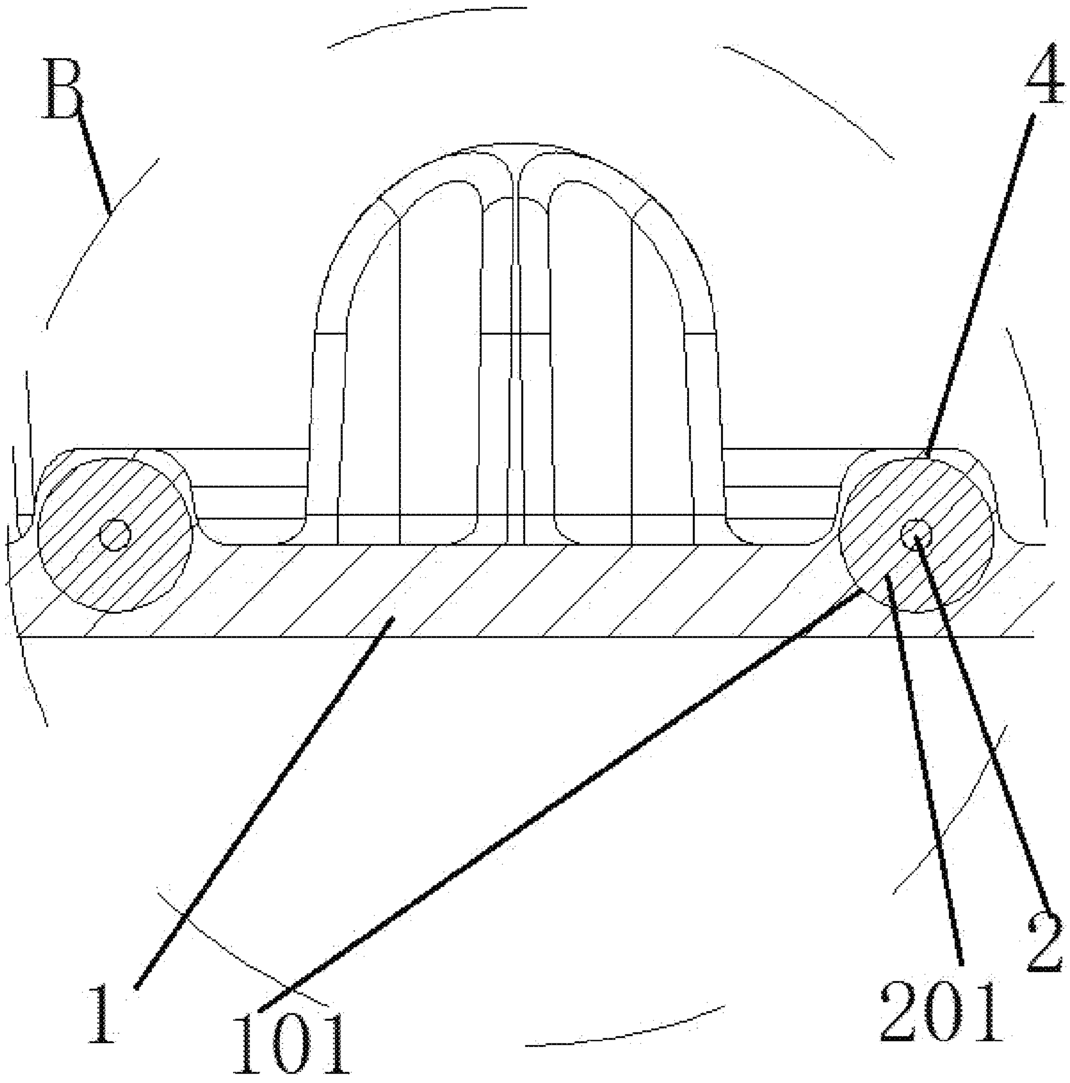
FIG. 7 is an enlarged view of area B in FIG. 6.
Figure 8:
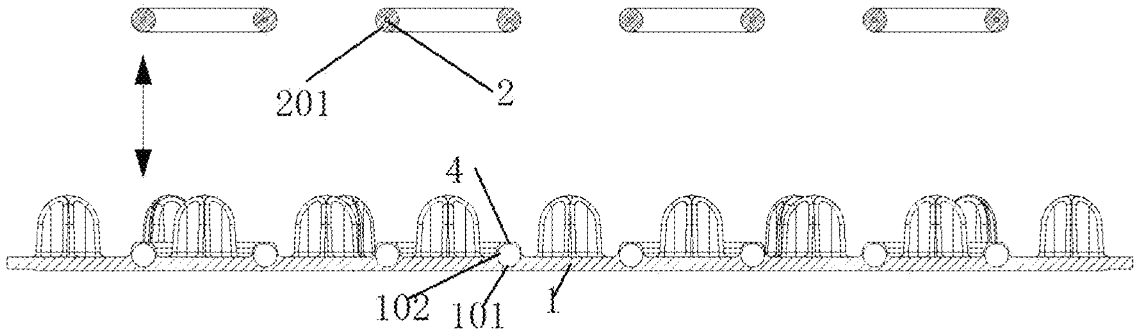
FIG. 8 is an exploded, cross-sectional view in accordance with the embodiments of the present disclosure.
Figure 9:
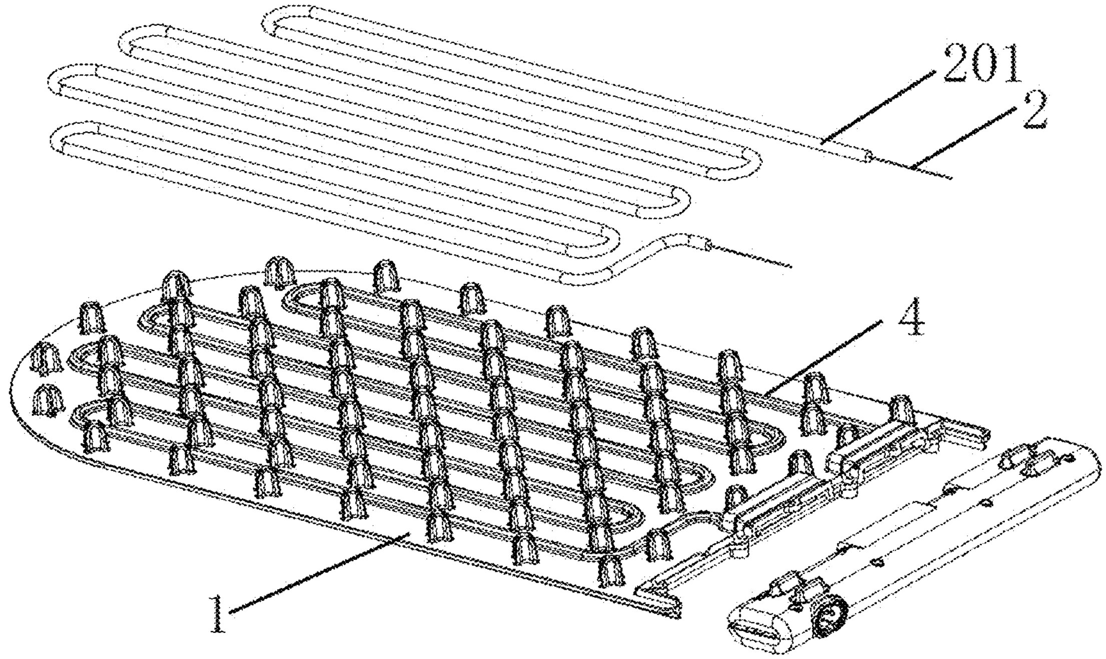
FIG. 9 is an exploded, perspective view in accordance with the embodiments of the present disclosure.
Figure 10:
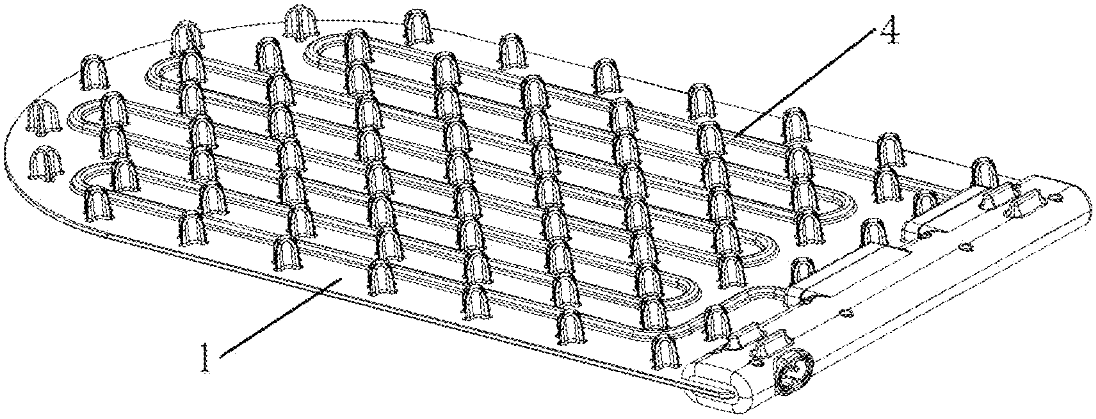
FIG. 10 is a perspective view of a body in accordance with the embodiments of the present disclosure.

Referring to FIGS. 6-10, a continuous spacing-limiting housing 4 is provided below the winding notch 102, the continuous spacing-limiting housing 4 is distributed along the extension direction of the wiring groove 101, and two side edges of the continuous spacing-limiting housing 4 are respectively hot-melted with two side edges of the winding notch 102 to form an integrated body. The continuous spacing-limiting housing 4 limits the heating wire 2 within the flexible sleeve 201 and the wiring groove 101. By arranging the continuous spacing-limiting housing 4, the heating wire 2 and the flexible sleeve 201 can be limited to improve stability.

Manufacturing process is described as follows.

Step S1, selecting a heating pad 1, a heating wire 2, and a mold. The heating pad 1 is a flexible pad, a bottom surface of the heating pad 1 is provided with a winding wiring groove 101, a bottom of wiring groove 101 is provided with a winding notch 102; the heating wire 2 is sleeved by a winding flexible sleeve 201; and the mold is provided with a wiring channel.

Step S2, wiring: first clamping flexible sleeve 201 and the continuous spacing-limiting housing 4 under the flexible sleeve 201 in the wiring channel of the mold, and then pressing the flexible sleeve 201 carrying the heating wire 2 into the wiring groove 101 of the heating pad 1 by using the mold.

Step S3, hot melting: integrating the flexible sleeve 201 carrying the heating wire 2 with the wiring groove 101 of the heating pad 1 through hot melting by using the mold; and two side edges of the continuous spacing-limiting housing 4 are integrated with two side edges of the notch 102 by hot melting.

Step S4, demolding: removing the wiring channel of the mold from the continuous spacing-limiting housing 4.

Figure 11:
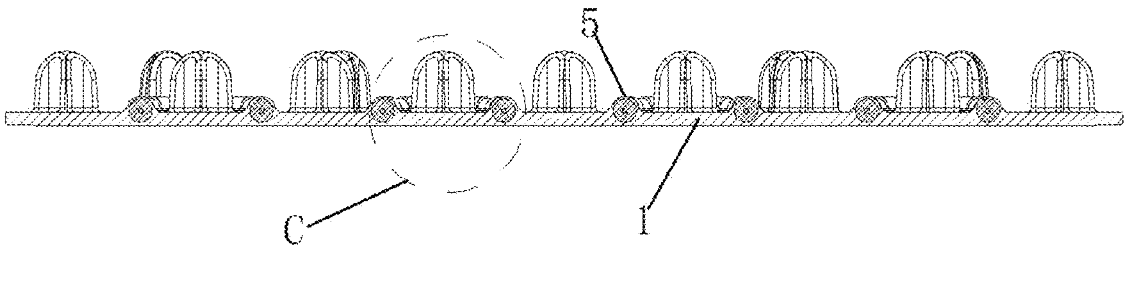
FIG. 11 is a cross-sectional view in accordance with the embodiments of the present disclosure.
Figure 12:
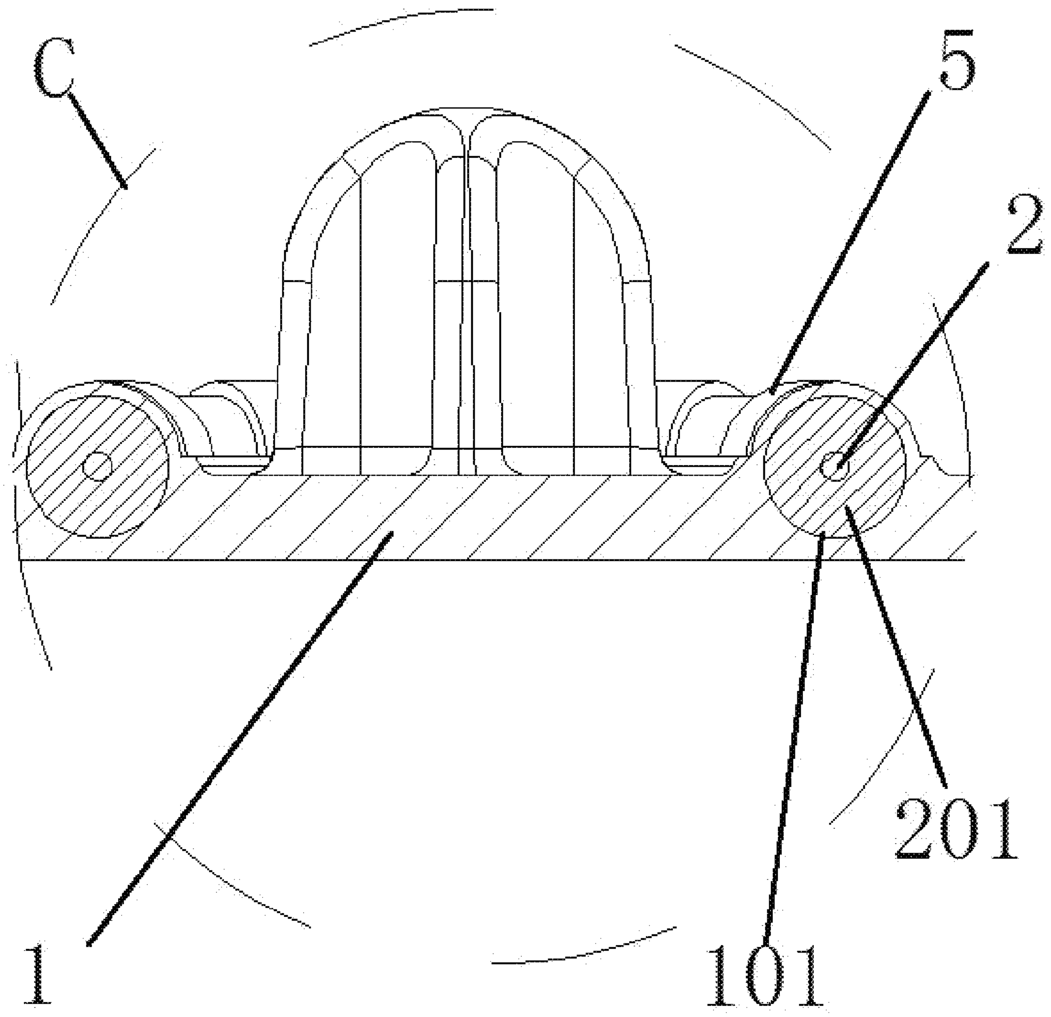
FIG. 12 is an enlarged view of area C in FIG. 11.
Figure 13:
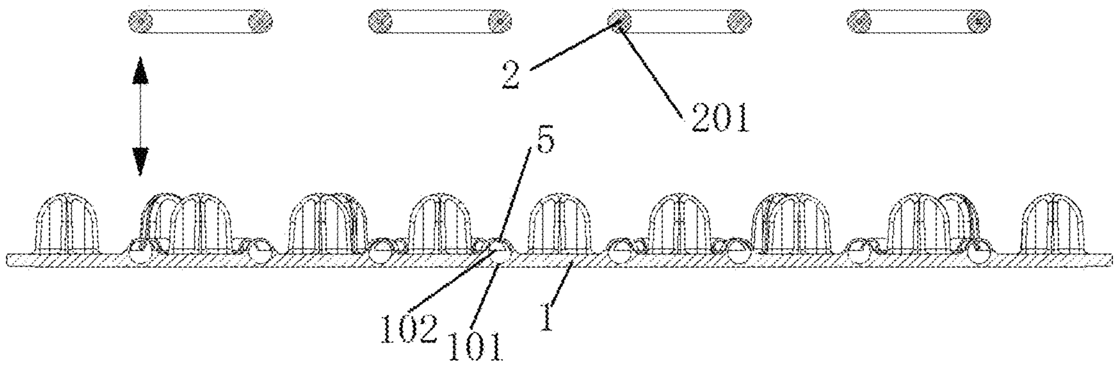
FIG. 13 is an exploded, cross-sectional view in accordance with the embodiments of the present disclosure.
Figure 14:
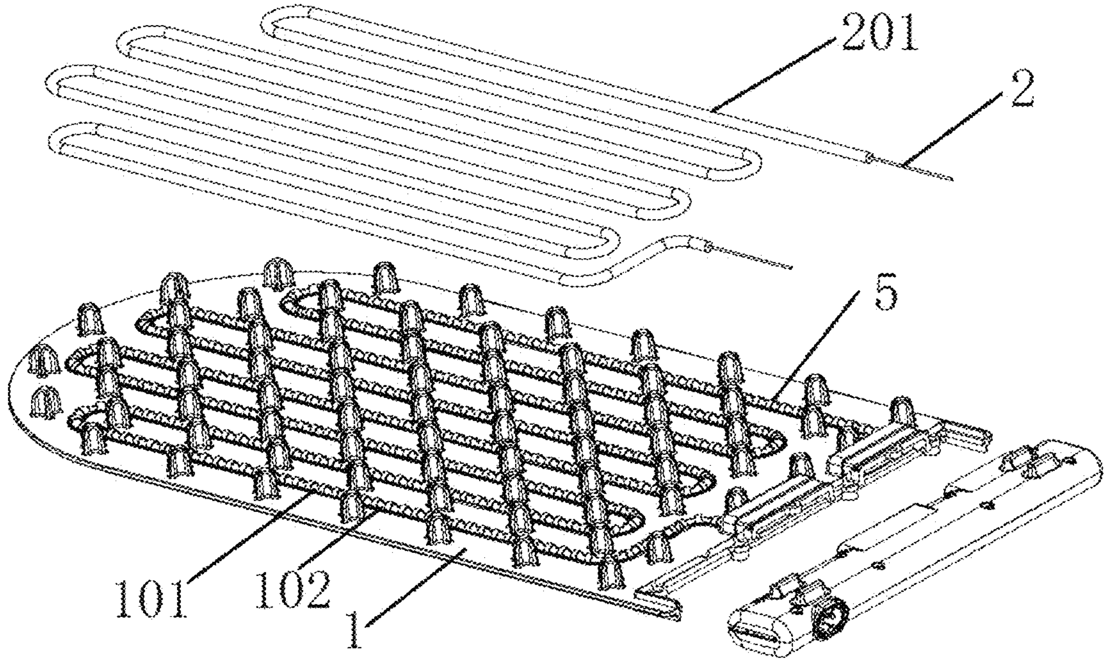
FIG. 14 is an exploded, perspective view in accordance with the embodiments of the present disclosure.
Figure 15:
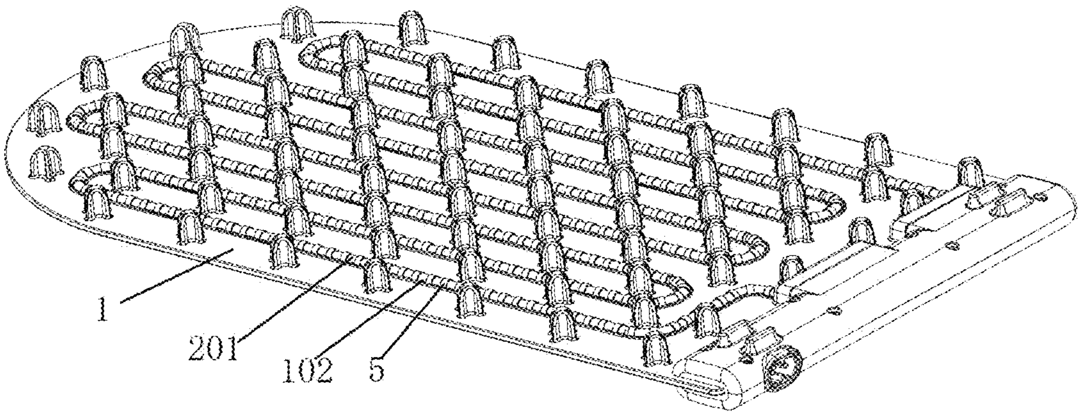
FIG. 15 is a perspective view in accordance with the embodiments of the present disclosure.

Referring to FIGS. 11-15, a plurality of segmented spacing-limiting housings 5 are provided below the winding notch 102, and the plurality of segmented spacing-limiting housings 5 are sequentially distributed along the extension direction of the wiring groove 101.

A gap is formed between adjacent two spacing-limiting housings 5. Two side edges of each segmented spacing-limiting housing 5 are respectively hot-melted and integrally formed with two side edges of the winding notch 102. The segmented spacing-limiting housings 5 establish spaced retention for the heating wire 2 within the flexible sleeve 201 and the wiring groove 101. By arranging the segmented spacing-limiting housings 5, the heating wire and the flexible sleeve can be limited to improve stability.

Manufacturing process is described as follows.

Step S1, selecting a heating pad 1, a heating wire 2, and a mold. The heating pad 1 is a flexible pad, a bottom surface of heating pad 1 is provided with a winding wiring groove 101, a bottom of wiring groove 101 is provided with a winding notch 102; the heating wire 2 is sleeved by a winding flexible sleeve 201; and the mold is provided with a wiring channel.

Step S2, wiring: first clamping the flexible sleeve 201 and the segmented spacing-limiting housings 5 which is under the flexible sleeve 201 into the wiring channel of the mold, and then pressing the flexible sleeve 201 carrying the heating wire 2 into the wiring groove 101 of the heating pad by using the mold.

Step S3, hot melting: integrating the flexible sleeve 201 sleeving the heating wire 2 with the wiring groove 101 of the heating pad 1 through hot melting by using the mold. Two side edges of each segmented spacing-limiting housing 5 are respectively integrated with two side edges of the winding notch 102 through hot melting.

Step S4, demolding: removing the wiring channel of the mold from the segmented spacing-limiting housings 5.

The above are some embodiments of the present disclosure. It should be pointed out that, for a person of ordinary skill in the art, the improvements and modifications can be made without departing from the principle of the present disclosure. These improvements and modifications are also considered to be within the protection scope of the present disclosure.

What is claimed is:

1. A food warming pad, comprising a heating pad and a heating wire, wherein the heating pad is a flexible pad, a bottom surface of the heating pad is provided with a wiring groove, a bottom of the wiring groove is defined with a winding notch;

the heating wire is sleeved by a flexible sleeve, the flexible sleeve is installed in the wiring groove, the flexible sleeve is distributed along an extension direction of the wiring groove, a bottom of the flexible sleeve is protruded outside the winding notch, and the flexible sleeve and the wiring groove are hot-melt-molded into one piece;

wherein when the food warming pad is placed upside down relative to a normal operating position of the food warming pad, an edge of the winding notch is protruded vertically with respect to the bottom surface of the heating pad, the bottom surface of the heating pad define a recessed area with respect to the edge of the winding notch, and the recessed area does not overlap with the winding notch.

2. The food warming pad according to claim 1, wherein the heating pad is a silicone pad, and the flexible sleeve is a silicone sleeve.

3. The food warming pad according to claim 1, wherein the bottom surface of the heating pad is further provided with a plurality of foot pads, and a distance that a bottom surface of each of the plurality of foot pads protrudes with respect to the bottom surface of the heating pad is greater than a distance that the edge of the winding notch protrudes with respect to the bottom surface of the heating pad.

4. The food warming pad according to claim 1, wherein a power supply is provided at an edge of the heating pad, and two ends of the heating wire are electrically connected to the power supply.

5. The food warming pad according to claim 1, wherein a cross-section of the wiring groove is arc-shaped or square, and a cross-section of the flexible sleeve is circular.

6. The food warming pad according to claim 1, wherein a thickness of the flexible sleeve is not smaller than 2 mm, and an outer diameter of the flexible sleeve is not smaller than 5 mm.

7. The food warming pad according to claim 1, wherein the wiring groove comprises a plurality of mutually parallel straight segments and a plurality of winding segments, and the plurality of straight segments are connected to the plurality of winding segments alternately.

8. The food warming pad according to claim 1, wherein a continuous housing is provided below the winding notch, the continuous housing is distributed along the extension direction of the wiring groove, two side edges of the continuous housing are respectively hot-melted and integrally formed with two side edges of the winding notch, and the continuous housing establishes a retention on the flexible sleeve and the wiring groove.

9. The food warming pad according to claim 1, wherein a plurality of segmented housings are provided below the winding notch, the plurality of segmented housings are sequentially distributed and spaced apart from each other along the extension direction of the wiring groove, two side edges each of the plurality of segmented housings are respectively hot-melt-molded with two side edges of the winding notch, and the plurality of segmented housings establish retentions for the flexible sleeve and the wiring groove.

10. A food warming pad, comprising a heating pad and a heating wire, wherein the heating pad is a flexible pad, a surface of the heating pad is provided with a wiring groove distributed in a winding pattern, the wiring groove is defined with a winding notch; the heating wire is sleeved in a flexible sleeve, the flexible sleeve carrying the heating wire is installed in the wiring groove, the flexible sleeve is distributed along an extension direction of the wiring groove, a portion of the flexible sleeve is protruded with respect to a surface of the winding notch, and the flexible sleeve and the wiring groove are an integrated structure;

wherein when the food warming pad is placed upside down relative to a normal operating position of the food warming pad, an edge of the winding notch is protruded vertically with respect to a bottom surface of the heating pad, the bottom surface of the heating pad define a recessed area with respect to the edge of the winding notch, and the recessed area does not overlap with the winding notch.

11. The food warming pad according to claim 10, wherein a continuous housing is provided on the winding notch, the continuous housing is distributed along the extension direction of the wiring groove, two side edges of the continuous housing are respectively integrated with two side edges of the winding notch, and the continuous housing is configured to limit positions of the flexible sleeve and the wiring groove.

12. The food warming pad according to claim 10, wherein a plurality of segmented housings are provided on the winding notch, the plurality of segmented housings are sequentially distributed and spaced apart from each other along the extension direction of the wiring groove, two side edges each of the plurality of segmented housings are respectively integrated with two side edges of the winding notch, and the plurality of segmented housings are configured to limit positions of the flexible sleeve and the wiring groove.

13. The food warming pad according to claim 10, wherein the heating pad is further provided with a plurality of foot pads, and a distance that a bottom surface of each of the plurality of foot pads protrudes with respect to the bottom surface of the heating pad is greater than a distance that an edge of the winding notch protrudes with respect to the bottom surface of the heating pad.

* * * * *